(12) United States Patent
Anno

(10) Patent No.: US 6,556,922 B2
(45) Date of Patent: Apr. 29, 2003

(54) NON-STATIONARY FILTER DESIGN AND APPLICATION FOR SEISMIC SIGNALS

(75) Inventor: Phil Anno, Ponca City, OK (US)

(73) Assignee: Conoco Inc., Ponca City, OK (US)

( * ) Notice: Subject to any disclaimer, the term of this patent is extended or adjusted under 35 U.S.C. 154(b) by 0 days.

(21) Appl. No.: 09/862,822

(22) Filed: May 22, 2001

(65) Prior Publication Data

US 2002/0183931 A1 Dec. 5, 2002

(51) Int. Cl.$^7$ ................................................ G01V 1/28
(52) U.S. Cl. ....................................................... 702/17
(58) Field of Search ....................... 702/17, 14; 367/46, 367/45, 73

(56) References Cited

U.S. PATENT DOCUMENTS

| | | | |
|---|---|---|---|
| 5,060,202 A | 10/1991 | Meek et al. | 367/45 |
| 5,740,036 A | 4/1998 | Ahuja et al. | 364/321 |
| 5,781,502 A | 7/1998 | Becquey | 367/31 |
| 5,850,622 A | 12/1998 | Vassiliou et al. | 702/17 |

OTHER PUBLICATIONS

Xiaogui Miao et al.; *Noise attenuation with Wavelet transforms*, 1998 SEG Expanded Abstracts, 68th Annual Internat. Mtg.: Soc. of Expl. Geophys., pp. 1072–1075.

Juliette W. Ioup et al.; *Noise removal and compression using a wavelet transform*, 1998 SEG Expanded Abstracts, 68th Annual Internat. Mtg.: Soc. of Expl. Geophys., pp. 1076–1079.

X.G. Miao et al.; *Application of the wavelet transform in seismic data processing*, 64th Ann. Internat. Mtg.: Soc. of Expl. Geophys., pp. 1461–1464.

Minh–Quy Nguyen et al.; *Filtering surface waves using 2D Discrete Wavelet Transform*, SEG 1999 Expanded Abstracts, 69th Ann. Internat. Mtg.: Soc. of Expl. Geophys., pp. 1228–1230.

Andrew J. Deighan et al.; *Filtering of seismic data in 1–D using a wavelet packet transform*, 67th Ann. Internat. Mtg.: Soc. of Expl. Geophys., pp. 1322–1325.

D.R. Watts et al., *Attenuation of marine wave swell noise by stacking in the wavelet packet domain*, 1999, 69th Ann. Internat. Mtg.: Soc. of Expl. Geophys., pp. 1220–1223.

A.J. Deighan et al.; *Wave Swell Noise Suppression Using a Wavelet Packet Transfoorm*, EAGE 60th Conference and Technical Exhibition, Jun. 12, 1998, Eur. Assn. Geosci. Eng., Session:02–56.

Gerard T. Schuster et al.; *Wavelet Filtering of Tube and Surface Waves*, 63rd Ann. Internat. Mtg.: Soc. of Expl. Geophys., p. 25–28.

Liu Faqi et al.; *Seismic Processing Using the Wavelet and the Radon Transform*, Journal of Seismic Exploration 4, 1995, pp. 375–390.

(List continued on next page.)

*Primary Examiner*—Donald E. McElheny, Jr.

(57) ABSTRACT

A method of designing and applying filters for geophysical time series data comprising obtaining a plurality of spatially related geophysical time series and transforming the time series using a wavelet transformation. The wavelet transformation coefficients may be organized into a plurality of subband traces. The method includes modifying one or more transform coefficients within a plurality of the subband traces or within all but one of the subbands of traces and then inverting the subband traces using an inverse transform to produce a filtered version of the transformed portion of the geophysical time series. The method allows for design and analysis of non-stationary filters and filter parameters in untransformed data space. Non-stationary signals may be filtered in all or in windowed portions of the geophysical time series data.

45 Claims, 6 Drawing Sheets

OTHER PUBLICATIONS

Didier Rappin et al., *Application of the Wavelet Transform to Time–Frequency Filtering, Multiples Removal and Lower Crust Frequency Studies*, 1992, 54th Mtg.: Eur. Assn. of Expl. Geophys., pp. 188–189.

Thang Nguyen et al.; *Matching Pursuit of Two Dimensional Seismic Data and Its Filtering Application*, SEG 2000 Expanded Abstracts, 70th Ann. Internat. Mtg.: Soc. of Expl. Geophys., pp. 2067–2069.

A.J. Deighan et al.; *Linear and Hyperbolic Velocity Filtering Using the 1D Wavelet Transform*, EAGE 59th Conference and Technical Exhibition, May 30, 1997, Session:P006.

Andrew J. Deighan et al.; *Ground–roll suppression using the wavelet transform*, Geophysics, vol. 62, No. 6, Nov.–Dec. 1997, pp. 1896–1903, 9 Figures.

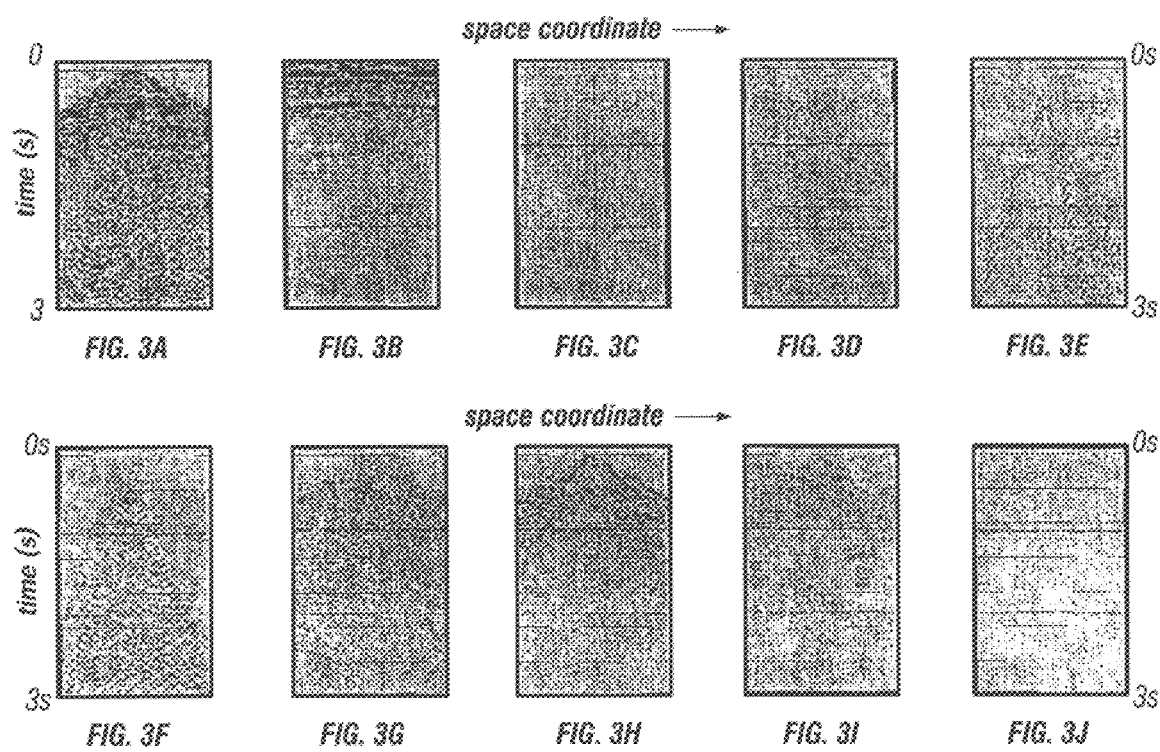

FIG. 5

| | 1 | 2 | 3 | 4 | 5 | 6 | 7 | 8 | 9 | 10 | 11 | 12 | 13 | 14 | 15 | 16 | $\hat{d}_j(\hat{t}_K)$ | |
|---|---|---|---|---|---|---|---|---|---|---|---|---|---|---|---|---|---|---|
| 1 | 1 | | | | | | | | | | | | | | | | $\hat{d}_0(1)$ | Subband $j=0$ |
| 2 | | 1 | | | | | | | | | | | | | | | $\hat{d}_0(2)$ | |
| 3 | | | 1 | | | | | | | | | | | | | | $\hat{d}_1(1)$ | Subband $j=1$ |
| 4 | | | | 1 | | | | | | | | | | | | | $\hat{d}_1(2)$ | |
| 5 | | | | | $\tilde{m}_2^{(1)}$ | | | | | | | | | | | | $\hat{d}_2(1)$ | Subband $j=2$ |
| 6 | | | | | | $\tilde{m}_2^{(2)}$ | | | | | | | | | | | $\hat{d}_2(2)$ | |
| 7 | | | | | | | $\tilde{m}_2^{(3)}$ | | | | | | | | | | $\hat{d}_2(3)$ | |
| 8 | | | | | | | | $\tilde{m}_2^{(4)}$ | | | | | | | | | $\hat{d}_2(4)$ | |
| 9 | | | | | | | | | 1 | | | | | | | | $\hat{d}_3(1)$ | Subband $j=3$ |
| 10 | | | | | | | | | | 1 | | | | | | | $\hat{d}_3(2)$ | |
| 11 | | | | | | | | | | | 1 | | | | | | $\hat{d}_3(3)$ | |
| 12 | | | | | | | | | | | | 1 | | | | | $\hat{d}_3(4)$ | |
| 13 | | | | | | | | | | | | | 1 | | | | $\hat{d}_3(5)$ | |
| 14 | | | | | | | | | | | | | | 1 | | | $\hat{d}_3(6)$ | |
| 15 | | | | | | | | | | | | | | | 1 | | $\hat{d}_3(7)$ | |
| 16 | | | | | | | | | | | | | | | | 1 | $\hat{d}_3(8)$ | |

Row Number / Column Number

501 / 503

NON-STATIONARY FILTER DESIGN AND APPLICATION FOR SEISMIC SIGNALS

FIELD OF THE INVENTION

This invention relates to the field of geophysical prospecting and, more particularly to methods for acquiring and processing seismic data.

BACKGROUND OF THE INVENTION

In the oil and gas industry, geophysical seismic data analysis and processing techniques are commonly used to aid in the search for and evaluation of subterranean hydrocarbon deposits. Generally, a seismic energy source is used to generate a seismic signal that propagates into the earth and is at least partially reflected by subsurface seismic reflectors (i.e., interfaces between underground formations having different acoustic impedances). The reflections are recorded in a geophysical time series by seismic detectors located at or near the surface of the earth, in a body of water, or at known depths in boreholes, and the resulting seismic data may be processed to yield information relating to the location of the subsurface reflectors and the physical properties of the subsurface formations.

Seismic or acoustic energy may be from an explosive, implosive, swept-frequency (chirp) or random source. A geophysical time series recording of the acoustic reflection and refraction wavefronts that travel from the source to a receiver is used to produce a seismic field record. Variations in the travel times of reflection and refraction events in these field records indicate the position of reflection surfaces within the earth. The analysis and correlation of events in one or more field records in seismic data processing produces an acoustic image that demonstrates subsurface structure. The acoustic images may be used to aid the search for and exploitation of valuable mineral deposits.

These seismic data are processed to be useful for delineating features in the earth's subsurface. Geophysical time series data acquired in the field often contain unwanted energy as well as desired energy. Some of the unwanted energy may interfere with, overwhelm or otherwise mask desired seismic energy useful for subsurface investigations. There are many known methods for filtering or separating unwanted energy from seismic signals.

Prior art processing methods for eliminating unwanted energy include frequency filtering, windowed frequency filtering, and f-k filtering. Filtering may be applied to each trace individually or to multiple traces concurrently. Elimination of unwanted energy traditionally results from the application of filtering to entire traces regardless of whether the unwanted energy is localized in only part of the data trace.

Traditional filtering is usually implemented in frequency-time space using orthogonal basis functions having perfect localization in frequency but infinite extent in time. Use of the Fourier transform is well known in the art and the most common type of filtering for geophysical data. The underlying assumption of this type of filtering is that the seismic signals are stationary (e.g., do not have time dependent statistical characteristics). However, it is well known in the art that many types of seismic signals recorded in the field are non-stationary. It would be beneficial to filter geophysical time series data containing unwanted non-stationary energy without adversely impacting desired seismic signal.

An alternative to the Fourier transform is the continuous wavelet transform (CWT). In the continuous wavelet transform, a function $\psi$ is used to create a family of wavelets $\psi$ (at+b) where a and b are real numbers, a dilating the function $\psi$ and b translating the function. The CWT turns a signal f(t) into a function with two variables (scale and time), which may be called c(a,b) such that $c(a,b) = \int f(t) \psi (at+b) dt$. The CWT allows for joint time-frequency localization ideal for non-stationary filtering. The discrete wavelet transform (DWT) is a special case of the CWT.

Wavelet methods may be designed in transform space rather than data space. However, as is evident from comparing FIG. 2A, data prior to transformation, with FIG. 2B, data from the same seismic record after transformation with wavelet methods, the wavelet transform alters coordinate relationships in the original geophysical time series data ensemble. This altered coordinate relationship is due to an inescapable limitation on joint time-frequency resolution imposed by the transform technique. Though the transformed data contains the required non-stationary time-frequency signal characteristics, signal components are difficult to recognize from their original space-time geometry. To address this dilemma, some practitioners have developed graphing techniques to approximately restore original data-space coordinate relationships to the transformed signals. The details of the technique depend on the particular choice of transform. Deighan and Watts (1997) give an example for a wavelet transform in FIG. 6 of their paper. (GEOPHYSICS, VOL. 62, NO. 6, NOVEMBER-DECEMBER 1997; P. 1896–1903) U.S. Pat. No. 5,781,502 to Becquey proposes a method to discriminate elliptical waves propagating in a geologic formation by a combined process that includes measuring and comparing ratios of components along several wave axes. The method calls for the use of multi-component seismic data. The method is directed to removing elliptical waves from seismic data after wavelet analysis is used to determine the surface or tube waves in the data. The detected signals are subtracted from the field records.

U.S Pat. No. 5,850,622 to Vassiliou et al. disclose a method to filter seismic data using very short-time Fourier transforms. The method utilizes a very great number of short overlapping Fourier transform windows, together with a Gaussian weight or taper function, to produce a plurality of near single-frequency "sub-band" traces for each seismic trace so analyzed. The transformed data may be used for selective removal of coherent noise events, analysis for seismic attributes related to subsurface features of interest, seismic trace creation by interpolation, and automatic identification and removal of noisy seismic traces.

SUMMARY OF THE INVENTION

A method of designing and applying filters for geophysical time series data is described which comprises obtaining a plurality of spatially related geophysical time series and transforming the time series using a wavelet transformation. The wavelet transformation coefficients may be organized into a plurality of subband traces. The method includes modifying one or more transform coefficients within a plurality of the subband traces or within all but one of the subbands of traces and then inverting the subband traces using an inverse transform to produce a filtered version of the transformed portion of the geophysical time series. The method allows for design and analysis of non-stationary filters and filter parameters in untransformed data space. Non-stationary signals may be filtered in all or in windowed portions of the geophysical time series data.

BRIEF DESCRIPTION OF THE DRAWINGS

The present invention and its advantages will be better understood by referring to the following detailed description and the attached drawings in which:

FIGS. 3a through 3j illustrates seismic data with varying frequency filters applied.

FIG. 5 illustrates an embodiment of the wavelet filtering process.

Figure 1A:
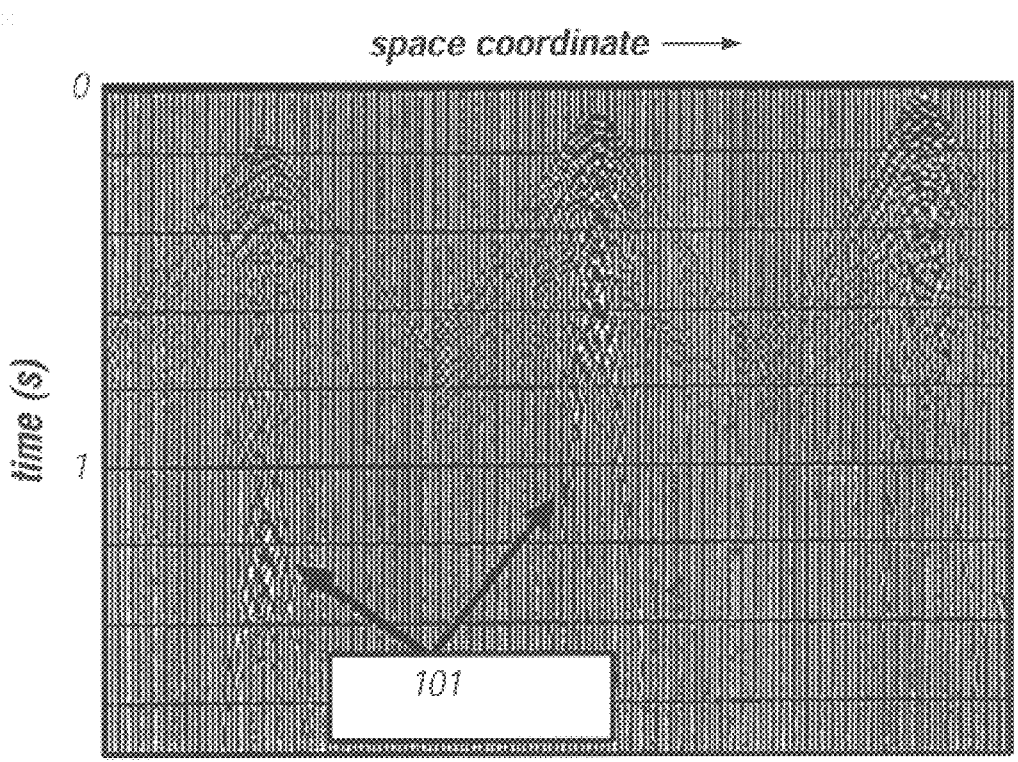
FIGS. 1A and 1B illustrate a 3D common shot ensemble of geophysical time series seismic signals before and after non-stationary filtering by wavelet transform.

While the invention will be described in connection with its preferred embodiments, it will be understood that the invention is not limited thereto. On the contrary, it is intended to cover all alternatives, modifications, and equivalents that may be included within the spirit and scope of the invention, as defined by the appended claims.

DETAILED DESCRIPTION OF THE PREFERRED EMBODIMENTS

The present invention is a method for designing and applying non-stationary filters using wavelet transforms that overcome the above-described deficiencies of current seismic processing practices. The filtering technique of the present invention provides for very efficient filter design and parameterization as well as full or partial suppression of non-stationary seismic energy in field records. The filters may be applied in a time-localized manner to further reduce impacting desired signal at other record times. Other advantages of the invention will be readily apparent to persons skilled in the art based on the following detailed description. To the extent that the following detailed description is specific to a particular embodiment or a particular use of the invention, this is intended to be illustrative and is not to be construed as limiting the scope of the invention.

This invention provides effective non-stationary filters for attenuating non-stationary and stationary noise components in geophysical time series data signals. Noise components often interfere with desired signal within time and frequency data windows that vary according to source and receiver (spatial) location. This interference makes the composite signal non-stationary with respect to time and frequency. Groups of such signals with variable spatial location thus form an ensemble that is also non-stationary with respect to space. Ground roll, airwaves, swell noise, and cable noises are some examples of the noise components typically present in seismic data. The parameterization of the present invention prescribes filters adapted to the non-stationary characteristics of such noise.

Many practitioners have applied non-stationary filters over the time coordinate of seismic signals. However, these filters lack an adequate process for determining time support of the filter within an ensemble of data. For example, the onset and termination times of the strong and unwanted airwave energy vary significantly over a seismic data record. Considering that typical seismic surveys contain hundreds of such ensembles, each one with different unwanted energy time windows, this is a serious shortcoming of previous filter parameterizations. A method that would parameterize analytic trajectories prescribing nominal onset and termination times to eliminate unwanted energy in a time or space localized fashion is highly desirable. Under the new parameterization presented here, analytic trajectories for nominal onset and ending times of noise components (and thus filters) for each subband and spatial coordinate, may be designed and applied for every ensemble of geophysical time series data.

Many mathematical transforms exist for implementing time-frequency data decompositions necessary for non-stationary filters. Common transformations include wavelet transforms, wave packet transforms, sliding-window Fourier transforms, and matching pursuit decompositions. Each of these has different strengths and weaknesses. They provide different combinations of time-frequency resolution, accuracy and stability, and computational cost.

The wavelet transform may be applied as a discrete wavelet transform (DWT). The DWT is a convenient way of using the wavelet transform with digital geophysical time series data. In a discrete wavelet transform, a wavelet is translated and dilated only by discrete values. For example, the dilation may be a power of 2 and be of the form $\psi(2^j t+k)$, with j and k whole numbers. Orthogonal wavelets are a special case of discrete wavelets that give a representation without redundancy and lend themselves to fast algorithms.

Some prior art filtering algorithms, Fourier transform methods for example, mix transform-data coefficients along the space coordinate of geophysical time series ensembles to detect and attenuate noisy coefficients. These approaches assume the desired signal has greater spatial coherence than the noise component. Other approaches zero or mute, to a predetermined level, all coefficients within the time subband support of the filter. This practice can easily harm or delete desirable signal within that same time subband window.

FIG. 1A shows an example of non-stationary seismic energy, for instance airwaves 101 or ground roll, in a 3-D common-shot ensemble of geophysical time series data. The time-space distribution of the non-stationary energy component varies considerably, but predictably, throughout the ensemble. This noise concentrates, moreover, within particular subbands of the frequency spectrum. The present invention limits filter action within specified subband(s) to a computed time-space neighborhood of the undesirable signal present in geophysical time series data ensembles. Two analytic trajectories per subband define this neighborhood throughout the ensemble, wherever the noise component resides. The resulting filter passes data outside the prescribed time-space-subband window, unchanged and unharmed.

Desirable signal may also be present within that time-space-subband window. This parameterization employs a two-stage prescription for the filter action within the window of data to be filtered. This method of design biases filtering towards those data most likely to be noise-saturated.

This new filter design methodology presented here applies to invertible non-stationary transforms. Given an ensemble of signals, it conveys non-stationary characteristics in data space with the efficacy and cost afforded by that particular transform. One may therefore choose and evaluate filter design parameters directly in data space, incorporating the strengths and limitations imposed by one's choice of transform.

The new filter application parameterization of the present invention establishes a data-adaptive threshold with the assumption that only noisy data can exceed it. A complementary parameter defines a second data-dependent level. This two-stage filtering mechanism reduces to the second, lower level only those coefficients that exceed the first threshold, established for noise. This new filter parameterization applies to invertible non-stationary transforms. It prescribes a non-stationary filter consistent with the efficacy and cost afforded by that particular transform.

Figure 1B:
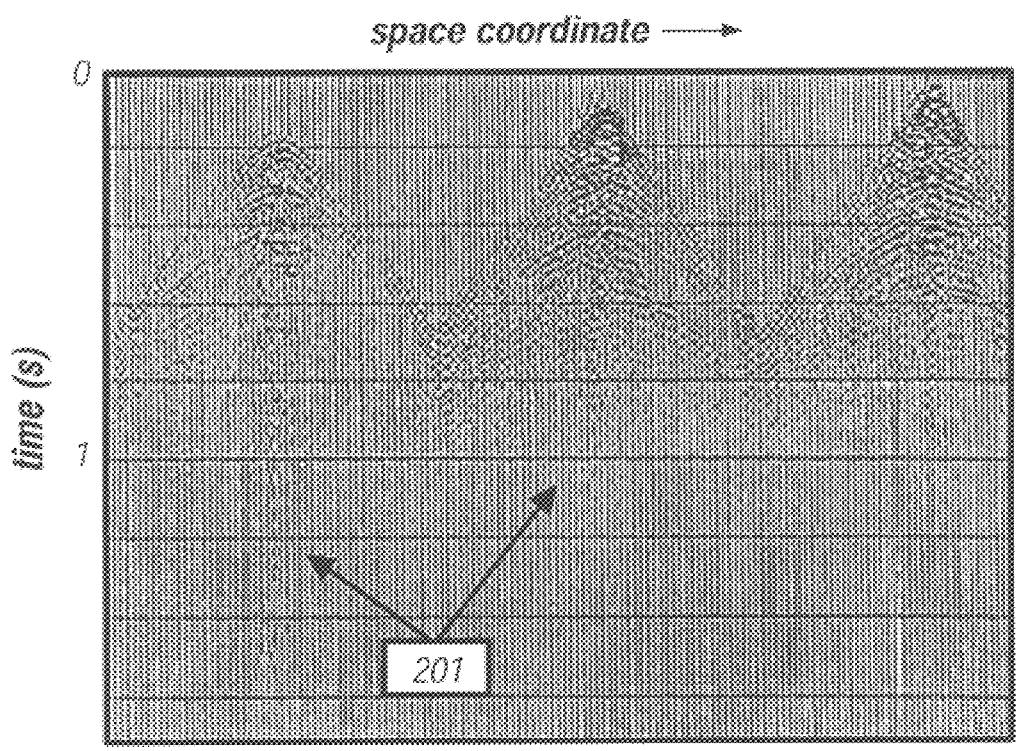

FIG. 1A compared to FIG. 1B gives a particular example of the application of a wavelet transform filter designed with the present invention. FIG. 1A contains non-stationary energy 101, for example airwave or ground roll energy. After filtering particular subbands of the data using the wavelet transform, the strong non-stationary energy 101 of FIG. 1A has been removed 201 in FIG. 1B demonstrating non-stationary filtering as prescribed by this new parameterization and implemented via wavelet transform.

This invention processes ensembles of seismic signals to produce output that is optimal for non-stationary filter design. The processed output allows analysis of non-stationary time-frequency characteristics in the non-transformed data space, thus permitting filter specification and testing directly in non-transformed data space. Non-transformed data space naturally preserves space-time coordinate relationships required for effective filter design. Moreover, practitioners ultimately judge effectiveness of the filter from its impact in non-transformed data space.

Figure 2A:
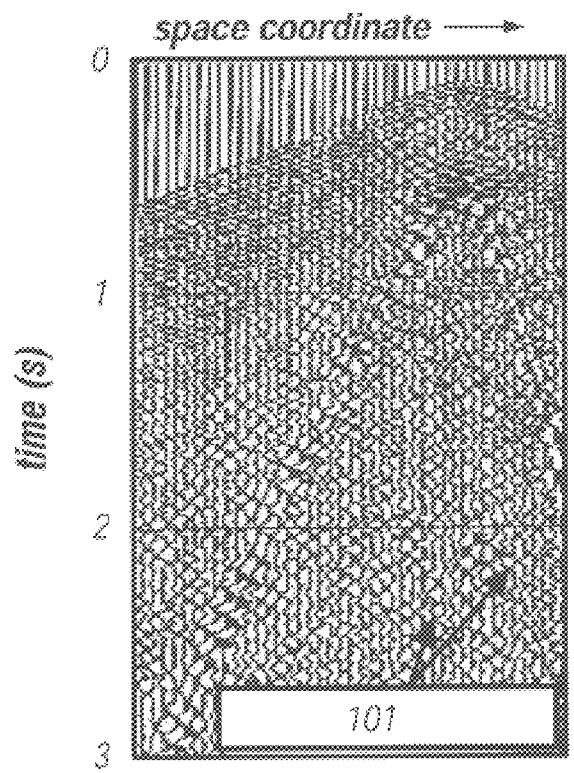
FIG. 2A illustrates a shot record containing non-stationary seismic energy.

Undesirable noise signal components often combine and interfere with the desired signal at variable times and with various frequencies. This interference results in non-stationary composite seismic signals. Non-stationary filters are therefore required to attenuate these undesirable components. Ground roll, airwaves, swell noise, and cable noises are examples of recorded seismic record components usually considered undesirable within the context of data processing objectives. FIG. 2A illustrates a shot record containing non-stationary seismic energy, ground roll and airwave components 101.

Figure 4:
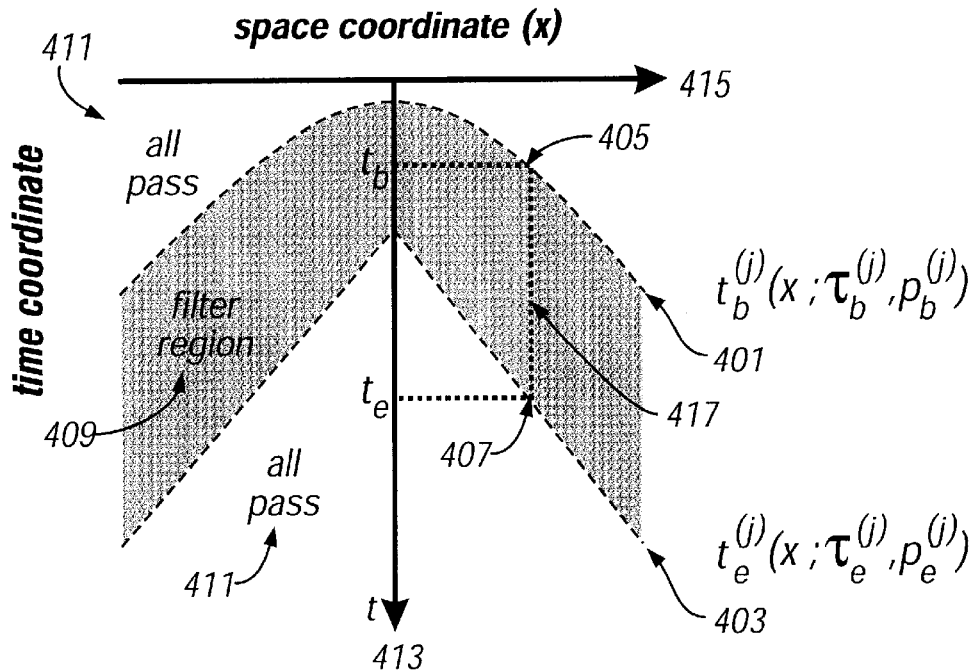
FIG. 4 illustrates filter design methodology in non-transformed data space.

This invention specifies the support of a non-stationary filter by a nominal beginning time $t_b$ and ending time $t_e$ as, for example, illustrated in FIG. 4. Parameter functions $t_b^{(j)}$ and $t_e^{(j)}$ give a pair of times at every spatial coordinate x in the data ensemble, and apply for every subband j of the filter. These functions encompass families of two-parameter trajectories, including the linear and hyperbolic examples depicted in FIG. 4. In FIG. 4 the beginning filter time $t_b$ is an example of a hyperbolic trajectory 401 and the ending filter time $t_e$ trajectory is an example of a linear function 403. In these two examples, scalars $\tau_b^{(j)}$ and $\tau_e^{(j)}$ take on the interpretation of beginning and ending times, respectively, at spatial coordinate x=0. For these linear and hyperbolic forms, scalars $p_b^{(j)}$ and $p_e^{(j)}$ assume the role of reciprocal velocity.

The horizontal axis of FIG. 4 represents the space coordinate 415. The vertical axis of FIG. 4 represents the time coordinate 413. Any arbitrary space coordinate position x 417 will have an associated time $t_b$ 405 and a $t_e$ 407 representing the beginning and end of the filter support region 409 for that space coordinate. The data areas 411 outside of the filter support region 409 are not filtered.

Figure 6:
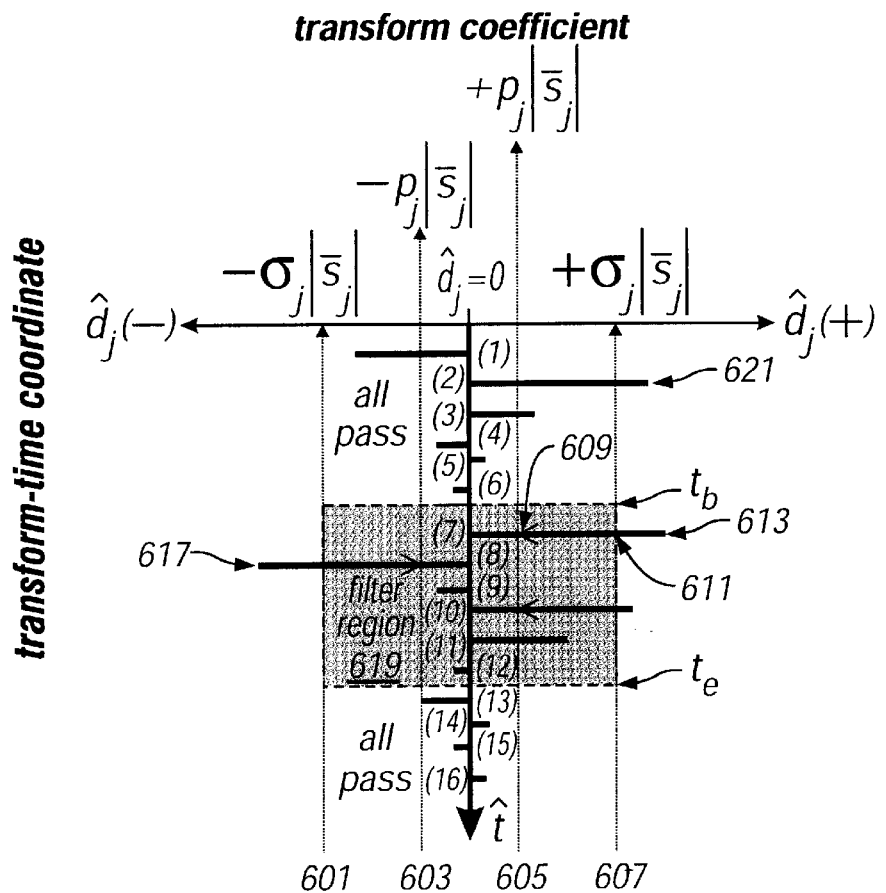
FIG. 6 illustrates the application of filter parameterization in transform-data space.

FIG. 6 is a transform-data space representation of the filter application parameters. This figure is a generalization of how the parameters are used to apply the filtering. The vertical axis in FIG. 6 is the transform time with an example 16 transform data coefficients. (1) through (16). The FIG. 6 horizontal axis represents the transformed data coefficient values with positive values to the right of transform coefficient $\hat{d}_j=0$ and negative values to the left. In FIG. 6, the example filter parameterization acts on only three of these 16 transform coefficients (1) through (16) along the FIG. 6 ttransform time vertical axis. This filter parameterization treats the remaining thirteen as desirable signal, preserving them without change. $\rho_L$ prescribes the filter attenuation level as a fraction of the $\bar{s}_j$ data statistic. These two parameters act in concert with the filter time-support parameters to detect and attenuate noise components in a data-dependent fashion.

FIG. 6 graphs the roles of transform-data scalar parameters $\sigma$, and $\rho_j$ in this invention $\sigma_j$ specifies a noise detection threshold as a percentage of $\bar{s}_j$, a data statistic computed from the transform coefficients in subband j of the ensemble. Reasonable choices for $\bar{s}_j$ include the mean, the median and variance of the data transform coefficients, and many others are possible. When transform data coefficients $\hat{d}_j$ in the filter region 619 exceed the threshold determined by $-\sigma_j|\bar{s}|$ 601 or $+\sigma_j|\bar{s}_j|$ 607, the muting function may reduce the data coefficient $\hat{d}_j$ to the values $-\rho_j|\bar{s}_j|$ 603 or $+\rho_j|\bar{s}_j|$ 605. For example, data coefficient $\hat{d}_j$ (2) has a magnitude 621 greater than $+\sigma_j|\bar{s}_j|$. However, data coefficient $\hat{d}_j$ (2) is not within window filter region 619, so no filtering of the data occur. Data coefficient $\hat{d}_j$ (7) also has a magnitude 613 which is greater than $+\sigma_j|\bar{s}_j|$ 611. Data coefficient $\hat{d}_j$ (7) is between the transform time coordinates $t_b$ at the beginning of the window filter region 619 window and the end of the window $t_e$. The filtering operation will attenuate the magnitude of the data coefficient $\hat{d}_j$ (7) to $+\rho_j|\bar{s}_j|$ 609 along the line represented by $+\rho_j|\bar{s}_j|$ 605. Similarly, data coefficient $\hat{d}_j$ (8) with transform coefficient 617 with a greater magnitude than $-\sigma_j|\bar{s}_j|$ 601 would be attenuated to $-\rho_j|\bar{s}_j|$ 603. Data coefficient $\hat{d}_j$ (10) exceeds the threshold magnitude so the data coefficient will be attenuated to $+\rho_j|\bar{s}_j|$ 605. The other data coefficients within the filter region 619 do not exceed the threshold magnitudes and would not be changed.

Importantly, one can readily determine this suite of parameters for the seismic noise components enumerated above. One gleans this information from analysis of a few representative data ensembles, selected from the recorded survey. To attenuate the airwaves or other non-stationary seismic energy in FIG. 1A or FIG. 2A we may choose, for example, linear forms for the filter trajectories. That is, $t_b^{(j)}(x)=\tau_b^{(j)}+p_b^{(j)}x$ and $t_e^{(j)}(x)=\tau_e^{(j)}+p_e^{(j)}x$, where x specifies the scalar distance from the source position to every receiver position in this ensemble. The remaining time-support parameters are determined as:

$\tau_b^{(j)}=0$, $\tau_e^{(j)}=0.25$, $p_b^{(j)}=1/300$, $p_e^{(j)}=1/300$. The airwave speed is about 300 m/s. The time support of the airwave is about 0.25 s. Further analysis shows this airwave to be concentrated in subbands j=5 and j=6 of the wavelet transform. For this example the data statistic, $s_1$, may be chosen to be the mean of the transform data. The data coefficient threshold and attenuation parameters may, again for this example, be chosen respectively as $\sigma_5=\sigma_6=10$, $\rho_5=\rho_6=1/0$. This parameter suite produces the filtered ensemble in FIG. 1B where the non-stationary energy present in FIG. 1A has been greatly attenuated or eliminated.

Figure 2B:
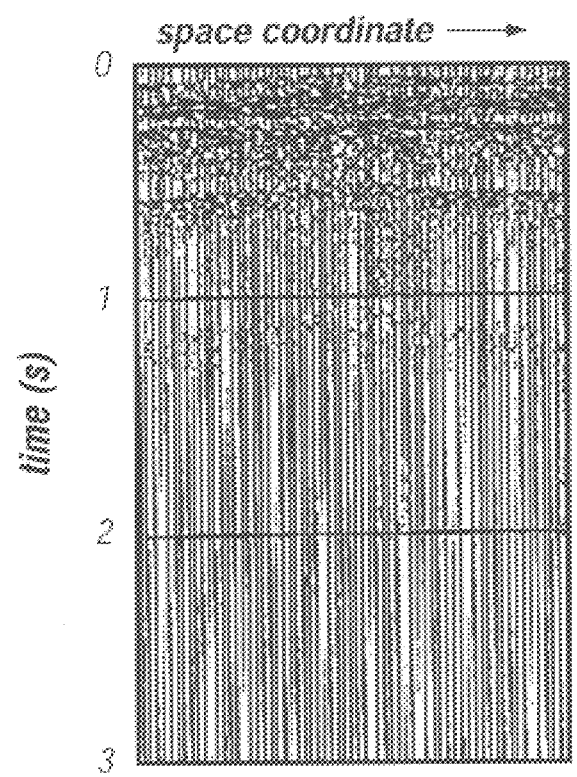
FIG. 2B illustrates the data of FIG. 2A after a wavelet transform has been applied.

The present invention enables non-stationary filter design in data space, the natural setting to observe space-time relationships. The present method restores space-time coordinate relationships to the data ensemble via the inverse transform, rather than through graphing in transform space. The problems inherent in designing filters in transform space may be seen by comparing FIG. 2B with FIG. 2A. FIG. 2B contains the data in FIG. 2A after applying a wavelet transform. There is a limitation on joint time-frequency resolution that makes the signal components difficult to recognize from their original space-time geometry. Importantly, the present invention preserves time-frequency signal characteristics required for non-stationary filter specification, which facilitates convenient filter specification and design. The method utilizes a sequence of muting operators in transform space, each one followed by the inverse transform. FIGS. 3a–3j are used to illustrate an example.

FIG. 3a through FIG. 3j is a common shot ensemble of filter panels from the seismic data of FIG. 2A. FIG. 3a is the same record as FIG. 2A. FIG. 3b is the wavelet-transformed data of FIG. 3a (i.e. the same record as FIG. 2B). FIGS. 3c through 3j are a progression of individual frequency bands inverse transformed after muting has been applied to wavelet transformed data of FIG. 2A. Each figure panel is produced by selectively muting the wavelet-transformed data followed by inverting the transformed data.

In the FIG. 3a–3j examples, the restored, linear geometry of the undesirable signal components primarily identifies them with frequency bands represented by FIG. 3e and FIG. 3f. The practitioner would therefore specify a non-stationary filter that attenuates subbands in FIG. 3e and FIG. 3f of the wavelet transform. Moreover, filter attenuation may be limited to a neighborhood of linear space-time coordinates occupied by the ground roll and airwave, such that no other data are filtered.

To use this invention for design of non-stationary filters for ensembles of seismic signals, operator $T^{-1} M_j T$ describes the entire filtering procedure in matrix notation. One applies non-stationary transform T to each input data vector in the ensemble, followed by filter operator $M_j$ and inverse transform $T^{-1}$. Operator $M_j$ modifies or otherwise filters all but the jth subband of the transform. FIGS. 3c–3j demonstrate the operator for various subbands of a wavelet transform. For this transform the (i,l)th matrix element of $M_j$ is: $m_{il}^{(j)} = \delta_{ip}\delta_{pl}$ where $p=2^j+k$ and k indexes the time samples within subband j.

To use this invention for applying the designed parameterization, operator $T^{-1}\tilde{M}_j T$ likewise describes the entire filtering procedure in matrix notation. One applies non-stationary transform T to each input data vector in the ensemble, followed by filter operator $\tilde{M}_j$ and inverse transform $T^{-1}$. Operator $\tilde{M}_j$ modifies or otherwise filters one or more (jth) subband of the transform. The details of this matrix operator depend on the details or characteristics of the signal and noise in T For a wavelet transform, the (i,l)th element of $\tilde{M}_j$ is: $\tilde{m}_{il}^{(j)} = \delta_{il} + \delta_{ip}(\tilde{m}_{pq} - \delta_{pq})\delta_{ql}$. Scalars $\tilde{m}_{pq}$ hold the data-dependent attenuation weights, where $p=q=2^j+k$ and k indexes the time samples within subband j.

A description of the elements of the non-stationary parameterization follows:

$T^{-1}\tilde{M}_j T$: Filter operator, where $\tilde{M}_j$ is the filter, T is a non-stationary transform and j indexes the subband.

$\bar{s}_j$: A statistic of the transform data (like mean, median, etc.; units are units of the transform data).

$\sigma_j$: Unitless scalar parameter $\geq 0$.

$\sigma_j|\bar{s}_j|$: Threshold for triggering filter.

$\rho_j$: Unitless scalar parameter $\geq 0$.

$\rho_j|\bar{s}_j|$: Replacement magnitude of filtered data.

$\mu_j$: Unitless muting coefficient that affects the magnitudes of data coefficient replacement values.

$$\mu_j = 1 \text{ for } |\hat{d}_j| < \sigma_j|\bar{s}_j| \text{ and } \mu_j = \rho_j\left|\frac{\bar{s}_j}{\hat{d}_j}\right| \text{ for } |\hat{d}_j| \geq \sigma_j|\bar{s}_j|.$$

$\hat{d}_j$: Transform data in subband j.

$$\alpha_j = \rho_j\left|\frac{\bar{s}_j}{\hat{d}_j}\right|$$

We may express $\mu_j$ as: $\mu_j = H(\sigma_j|\bar{s}_j|-|\hat{d}_j|) + \alpha_j H(|\hat{d}_j|-\sigma_j|\bar{s}_j|)$ where H is the Heaviside function defined as H (t−t')=0 for t<t' and H(t−t')=1 for t>t'.

Rewriting $\mu_j$:

$$\mu_j = 1 - H(|\hat{d}_j|-\sigma_j|\bar{s}_j|) + \alpha_j H(|\hat{d}_j|-\sigma_j|\bar{s}_j|) = 1 - (1-\alpha_j) H(|\hat{d}_j|-\sigma_j|\bar{s}_j|).$$

Note that $\mu_j = \mu_j(\hat{t})$ that is, $\mu_j$ depends on the transform time coordinate $\hat{t}_k$.

$\mu_j(\hat{t}_k) = 1 - (1-\alpha_j(\hat{t}_k))H(|\hat{d}_j(\hat{t}_k)|-\sigma_j|\bar{s}_j|)$ shows that muting coefficient $\mu_j$ depends on $\hat{t}_k$ thru $\hat{d}_j$ (and $\alpha_j$). Note: k indexes time coordinate twithin subband j.

Travel time trajectories are defined to parameterize regions of time-space coordinates over which muting coefficient $\mu_j(\hat{t}_k)$ will be applied.

$t_b$: Nominal beginning time of filter.

$t_e$: Nominal ending time of filter.

$t^{b,j}(X; \tau_{b,i}, p_{b,j})$: Scale dependent travel time trajectory for beginning times as function of space-coordinate x.

x: Space coordinate.

$\tau_{b,j}$: Beginning time at x=0.

$p_{b,j}$: Parameterizes trajectory shape.

Line trajectory: $t_{b,j} = \tau_{b,i} + p_{b,j}X$.

Parabola trajectory: $t_{b,j} = \tau_{b,j} + p_{b,j}X^2$.

Hyperbola trajectory: $t_{b,j}^2 = \tau_{b,j}^2 + p_{b,j}^2 X^2$.

$t_{e,j}(x; \tau_{e,j}, p_{e,j})$: Scale dependent travel time trajectory for ending times.

With nominal beginning and ending times given, respectively, as $t_{b,j}(x; \tau_{b,j}, p_{b,j})$ and $t_{e,j}(x; \tau_{e,j}, p_{e,j})$, we may write that $\tilde{m}_j(\hat{t}_k) = 1 - (1-\mu_j(\hat{t}_k))H(\hat{t}_k-t_b)H(t_e-\hat{t}_k) = 1 - (1-\mu_j(\hat{t}_k))(1-H(\hat{t}_k-t_e))H(\hat{t}_k-t_b)$ where $\tilde{m}_j(\hat{t}_k)$ is an element of the operator $\tilde{M}_j$ that applies transform-time dependent muting to the transform data $\hat{d}_j(\hat{t}_k)$.

FIG. 5 is an example of a muting operator for a Discrete Wavelet Transform (DWT). Take $N=2^J=16$, the number of samples in $\hat{d}$, the discrete wavelet transform data vector 503 where J=4. For j=2, the subband to be filtered, FIG. 5 is $\tilde{M}_2$, an example of $\tilde{M}_j$. To generalize the $\tilde{M}_j$ DWT example for $N=2^J$ data samples, vector $\tilde{m}_j(\hat{t}_k)$ may be mapped into 501 matrix $\tilde{m}_{il}^{(j)}$, the (i,l)th element of $\tilde{M}_j(i,l=1,2,\ldots,2^J)$.

Define $\tilde{m}_j(\hat{t}_k) \Delta \tilde{m}_{pq}$, with $p=q=2^j+k$, where $j=1,2,\ldots,J-1$ lists eligible subbands (j=0 is not a wavelet subband but is necessary for reconstruction), and $k=1,2,\ldots,2^j$ lists eligible time indices within subband j. Therefore, p and q range over all integers from $2^j+1$ so (k=1) to $2^{1+j}$ where(k=$2^j$).

These definitions give $\tilde{m}_{il}^{(j)} = \delta_{il} + \delta_{ip}(\tilde{m}_{pq}-\delta_{pq})\delta_{pl}$ for $i,l=1,2,\ldots,2^J$. $p=q=2^j+k$; $p,q=2^j+1, 2^j+2, \ldots, 2^{j+1}$. $j=1,2,\ldots, J-1$; and $k=1,2,\ldots,2^j$.

Figure 7:
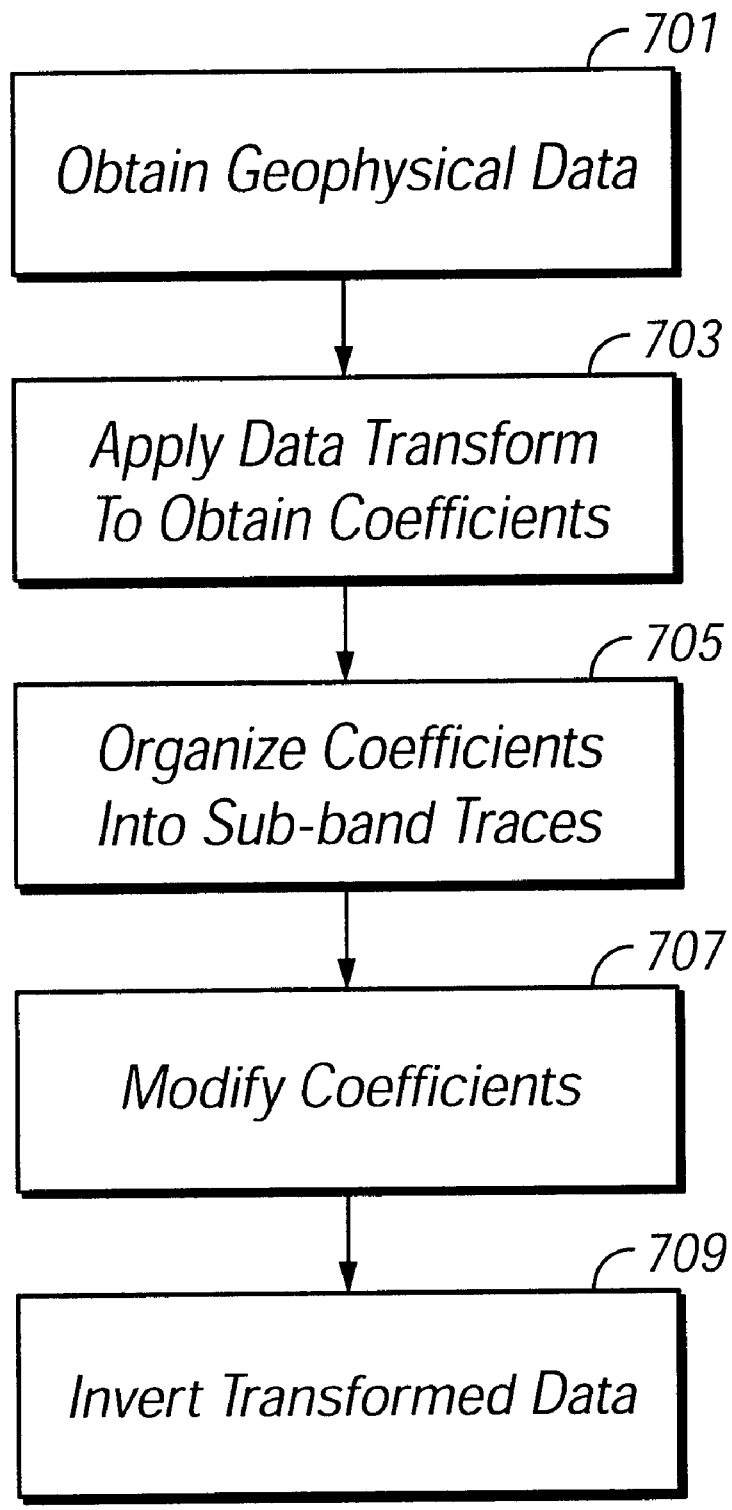
FIG. 7 illustrates a flow chart of the present invention.

A flow chart of the present invention is illustrated in FIG. 7. Data are obtained 701, for example a plurality of spatially related geophysical time series distributed over the earth, said geophysical time series containing data, the data being characterized by a travel time, a position, and an amplitude. These data may contain non-stationary energy difficult or impossible to remove using prior art methods. Portions of geophysical time series data may be more likely to contain undesirable energy components. At least a portion of these data transformed 703 using a wavelet transform that can produce transform coefficients. The transform coefficients are then organized 705 into a plurality of sub-band traces. The transform coefficients can then be modified 707 within at least one of the sub-band traces. For example, the modification may take place for a time window, a frequency window or a spatial window, to name a few choices. As disclosed by the explanations of the methods above, the chosen filter action may be targeted or limited within specified subband(s) to a computed time-space neighborhood of the undesirable signal present in geophysical time series data ensembles. The data are then inverted 709 using an inverse transform to produce filtered versions of the originally transformed data. As previously disclosed above, operator $T^{-1}M_jT$ describes how the entire filtering procedure in matrix notation may be applied.

Persons skilled in the art will understand that the methodology and processes for filter design and application described herein may be practiced in various forms including but not limited to the particular embodiments described herein. Further, it should be understood that the invention is not to be unduly limited to the foregoing which has been set forth for illustrative purposes. Various modifications and alternatives will be apparent to those skilled in the art without departing from the true scope of the invention, as defined in the following claims.

I claim:

1. A method of filtering geophysical time series, the method comprising:
    (a) obtaining a plurality of spatially related geophysical time series distributed over the earth, said geophysical time series containing data, said data being characterized by a travel time, a position, and an amplitude;
    (b) transforming at least a portion of said spatially related geophysical time series using a wavelet transformation, said wavelet transformation producing transform coefficients;
    (c) organizing said transform coefficients into a plurality of sub-band traces;
    (d) modifying at least one of said transform coefficients within at least one of said sub-band traces; and,
    (e) inverting said sub-band traces using a wavelet transform inverse, thereby producing a filtered version of said transformed portion of said spatially related geophysical time series.

2. A method according to claim 1 wherein modifying at least one of said transform coefficients includes the step of eliminating at least one sub-band of said wavelet transformation.

3. A method according to claim 1 wherein modifying at least one of said transform coefficients includes eliminating all but one sub-band of said wavelet transformation.

4. A method according to claim 1 wherein modifying at least one of said transform coefficients includes increasing a value of at least one transform coefficient.

5. A method according to claim 1 wherein modifying at least one of said transform coefficients includes decreasing a value of at least one transform coefficient.

6. A method according to claim 1 wherein said wavelet transform is a discrete wavelet transform and said transform coefficients are wavelet transform coefficients.

7. A method according to claim 1 wherein transforming at least a portion of said spatially related geophysical time series further comprises the steps of:
    (a) selecting at least one geophysical time series from said plurality of spatially related geophysical time series; and,
    (b) applying a wavelet transformation to each geophysical time series so selected, said wavelet transformation
        i) being applied to a windowed portion of said geophysical time series, said windowed portion having beginning and ending times,
        ii) being characterized by at least one wavelet subband, and
        iii) producing a plurality of transform coefficients associated with said at least one wavelet subband when so applied.

8. A method according to claim 7 wherein for each selected spatially related geophysical time series:
    (a) said plurality of transform coefficients are attenuated if the magnitudes of said coefficients exceed a predetermined threshold value, and
    (b) said coefficients that exceed a predetermined threshold value are attenuated to a pre-determined data value level.

9. A method according to claim 8 wherein said predetermined threshold value is determined from at least one of the group consisting of i) mean of the transform coefficient values, ii) median of transform coefficient values, iii) variance of transform coefficient values, and iv) a ratio of transform coefficient value statistics.

10. A method according to claim 8 wherein determination of attenuation value level of said coefficients is chosen with an arbitrary multiplicative parameter multiplied by a data dependent parameter, said data dependent parameter chosen from at least one of:
    (1) mean of transform coefficient values in subband,
    (2) median of transform coefficient values in subband,
    (3) variance of transform coefficient values in subband, and
    (4) ratios of transform coefficient values.

11. A method of determining filter parameters for geophysical time series, the method comprising:
    (a) obtaining a plurality of spatially related geophysical time series distributed over the earth, said geophysical time series containing data, said data being characterized by a travel time, a position, and an amplitude;
    (b) transforming at least a portion of said spatially related geophysical time series using a wavelet transformation, said wavelet transformation producing transform coefficients;
    (c) organizing said transform coefficients into a plurality of subband traces;
    (d) modifying at least one of said transform coefficients within at least one of said subband traces;
    (e) inverting said sub-band traces using a wavelet transform inverse, thereby producing a filtered version of said spatially related geophysical time series, and
    (f) determining which said subband traces contain non-stationary signals.

12. A method according to claim 11 wherein modifying at least one of said transform coefficients includes eliminating at least one sub-band of said transform.

13. A method according to claim 11 wherein modifying at least one of said transform coefficients includes eliminating all but one sub-band of said transform.

14. A method according to claim 11 wherein modifying at least one of said transform coefficients includes increasing at least one transform coefficient value.

15. A method according to claim 11 wherein modifying at least one of said transform coefficients includes decreasing at least one transform coefficient value.

16. A method according to claim 11 wherein said wavelet transform is a discrete wavelet transform and said transform coefficients are wavelet transform coefficients.

17. A method according to claim 11 wherein inverting said sub-band traces further comprises:
    (a) selecting at least one geophysical time series from said plurality of spatially related geophysical time series; and, (b) determining a subband of a wavelet transformation applied to each geophysical time series so selected, said subband containing non-stationary seismic signal.

18. A method according to claim 17 wherein for each selected spatially related geophysical time series:
    (a) said non-stationary signal is present within a windowed region of said selected geophysical time series, and
    (b) determining beginning and ending time parameters for said windowed region containing non-stationary signal of said selected geophysical time series.

19. A method according to claim 11 further comprising determining at least one statistic of transform data coefficients.

20. A method according to claim 19 wherein the at least one statistic of transform data coefficients is selected from the group consisting of i) mean of the transform coefficient values, ii) median of transform coefficient values, iii) variance of transform coefficient values, and iv) a ratio of transform coefficient value statistics.

21. A method according to claim 18 further comprising determining at least one statistic of transform data coefficients within said window.

22. A method according to claim 21 wherein the at least one statistic of transform data coefficients within said window is selected from the group consisting of i) mean of the transform coefficient values, ii) median of transform coefficient values, iii) variance of transform coefficient values, and iv) a ratio of transform coefficient value statistics.

23. A method according to claim 11 further comprising determining filter parameters to suppress non-stationary signals in said subband traces.

24. A method according to claim 11 further comprising determining filter parameters to modify non-stationary signals in said subband traces.

25. A method of determining filter parameters for geophysical time series, the method comprising:
    (a) obtaining a plurality of spatially related geophysical time series distributed over the earth, said geophysical time series containing data, said data being characterized by a travel time, a position, and an amplitude;
    (b) transforming at least a portion of said spatially related geophysical time series using a wavelet transformation, said wavelet transformation producing transform coefficients;
    (c) organizing said transform coefficients into a plurality of subband traces;
    (d) inverting said sub-band traces using a wavelet transform inverse, and
    (e) determining which said subband traces contain non-stationary signals.

26. A method according to claim 25 wherein said wavelet transform is a discrete wavelet transform and said transform coefficients are wavelet transform coefficients.

27. A method according to claim 25 wherein inverting said sub-band traces further comprises:
    (a) selecting at least one geophysical time series from said plurality of spatially related geophysical time series; and,
    (b) determining a subband of a wavelet transformation applied to each geophysical time series so selected, said subband containing non-stationary seismic signal.

28. A method according to claim 27 wherein for each selected spatially related geophysical time series:
    (a) said non-stationary signal is present within a windowed region of said selected geophysical time series, and
    (b) determining beginning and ending time parameters for said windowed region containing non-stationary signal of said selected geophysical time series.

29. A method according to claim 25 further comprising determining at least one statistic of transform data coefficients.

30. A method according to claim 29 wherein the at least one statistic of transform data coefficients is selected from the group consisting of i) mean of the transform coefficient values, ii) median of transform coefficient values, iii) variance of transform coefficient values, and iv) a ratio of transform coefficient value statistics.

31. A method according to claim 28 further comprising determining at least one statistic of transform data coefficients within said window.

32. A method according to claim 31 wherein the at least one statistic of transform data coefficients within said window is selected from the group consisting of i) mean of the transform coefficient values, ii) median of transform coefficient values, iii) variance of transform coefficient values, and iv) a ratio of transform coefficient value statistics.

33. A method according to claim 25 further comprising determining filter parameters to suppress non-stationary signals in said subband traces.

34. A method according to claim 25 further comprising determining filter parameters to modify non-stationary signals in said subband traces.

35. A method of filtering geophysical time series, the method comprising:
    (a) obtaining a plurality of spatially related geophysical time series distributed over the earth, said geophysical time series containing data said data being characterized by a travel time, a position, and an amplitude;
    (b) transforming at least a portion of said spatially related geophysical time series using a wavelet transformation, said wavelet transformation producing sub-band traces with transform coefficients;
    (c) modifying at least one of said transform coefficients within at least one of said sub-band traces; and,
    (d) inverting said sub-band traces using a wavelet transform inverse, thereby producing a filtered version of said spatially related geophysical time series.

36. A method according to claim 35 wherein modifying at least one of said transform coefficients includes the step of eliminating at least one sub-band of said wavelet transformation.

37. A method according to claim 35 wherein modifying at least one of said transform coefficients includes eliminating all but one sub-band of said wavelet transformation.

38. A method according to claim 35 wherein modifying at least one of said transform coefficients includes increasing a value of at least one transform coefficient.

39. A method according to claim 35 wherein modifying at least one of said transform coefficients includes decreasing a value of at least one transform coefficient.

40. A method according to claim 35 wherein said wavelet transform is a discrete wavelet transform and said transform coefficients are wavelet transform coefficients.

41. A method according to claim 35 wherein transforming at least a portion of said spatially related geophysical time series comprises the steps of:
    (a) selecting at least one geophysical time series from said plurality of spatially related geophysical time series; and, (b) applying a wavelet transformation to each geophysical time series so selected, said wavelet transformation
  i) being applied to a windowed portion of said geophysical time series, said windowed portion having beginning and ending times,
  ii) being characterized by at least one wavelet subband, and
  iii) producing a plurality of transform coefficients associated with said at least one wavelet subband when so applied.

42. A method according to claim 41 wherein for each selected spatially related geophysical time series:
  (a) said plurality of transform coefficients are attenuated if the magnitudes of said coefficients exceed a pre-determined threshold value, and
  (b) said coefficients that exceed a predetermined threshold value are attenuated to a pre-determined data value level.

43. A method according to claim 42 wherein said predetermined threshold value is determined from at least one of the group consisting of i) mean of the transform coefficient values, ii) median of transform coefficient values, iii) variance of transform coefficient values, and iv) a ratio of transform coefficient value statistics.

44. A method according to claim 42 wherein determination of attenuation value level of said coefficients is chosen with an arbitrary multiplicative parameter multiplied by a data dependent parameter, said data dependent parameter chosen from at least one of:
  (1) mean of transform coefficient values in subband,
  (2) median of transform coefficient values in subband,
  (3) variance of transform coefficient values in subband, and
  (4) ratios of transform coefficient values.

45. A method according to claim 42 further comprising obtaining the predetermined level based upon a data dependent parameter, said data dependent parameter chosen from at least one of:
  (1) mean of transform coefficient values in subband,
  (2) median of transform coefficient values in subband,
  (3) variance of transform coefficient values in subband, and
  (4) ratios of transform coefficient values.

* * * * *